United States Patent [19]

Davis

[11] 4,129,152
[45] Dec. 12, 1978

[54] DOUBLE WALL HELICAL PIPE AND STRIP CONFIGURATION FOR FORMING SAME

[75] Inventor: Paul K. Davis, Alameda, Calif.

[73] Assignee: Pacific Roller Die Co., Inc., Hayward, Calif.

[21] Appl. No.: 516,225

[22] Filed: Oct. 21, 1974

Related U.S. Application Data

[62] Division of Ser. No. 401,167, Sep. 27, 1973, Pat. No. 3,857,159.

[51] Int. Cl.² ............................................. F16L 9/16
[52] U.S. Cl. ..................................... 138/154; 138/103;
138/121; 138/129; 138/148; 138/173
[58] Field of Search ............... 138/121, 122, 129, 149,
138/148, 150, 154, 173, 103; 29/193, 193.5;
156/171, 184, 428; 160/229 R, 236; 161/125,
99, 48, 107; 428/152, 176, 126, 127, 128, 99, 33

[56]  References Cited

U.S. PATENT DOCUMENTS

| 2,067,801 | 1/1937 | Taylor .................................. 138/154 |
| 2,068,022 | 1/1937 | Hammel ............................... 138/173 |
| 2,330,966 | 10/1943 | Gottwald et al. ................... 138/149 |
| 2,713,381 | 7/1955 | Seck ..................................... 138/122 X |
| 2,739,089 | 3/1956 | Hageltorn ......................... 138/121 X |
| 3,199,541 | 8/1965 | Richitelli ............................. 138/129 |
| 3,330,303 | 7/1967 | Fochler ............................. 138/121 X |
| 3,621,884 | 11/1971 | Trihey ................................. 138/154 |
| 3,865,146 | 2/1975 | Meserole ............................. 138/154 |

Primary Examiner—Richard E. Aegerter
Assistant Examiner—James E. Bryant, III

[57]  ABSTRACT

Double wall helical pipe formed from a single metal strip, pipe forming method and configuration of strip for forming such pipe. A metal strip is formed with pipe seam elements and curled into overlapped helical convolutions, and the seam elements are secured together to provide a helical pipe seam. One or both pipe walls may be corrugated.

9 Claims, 16 Drawing Figures

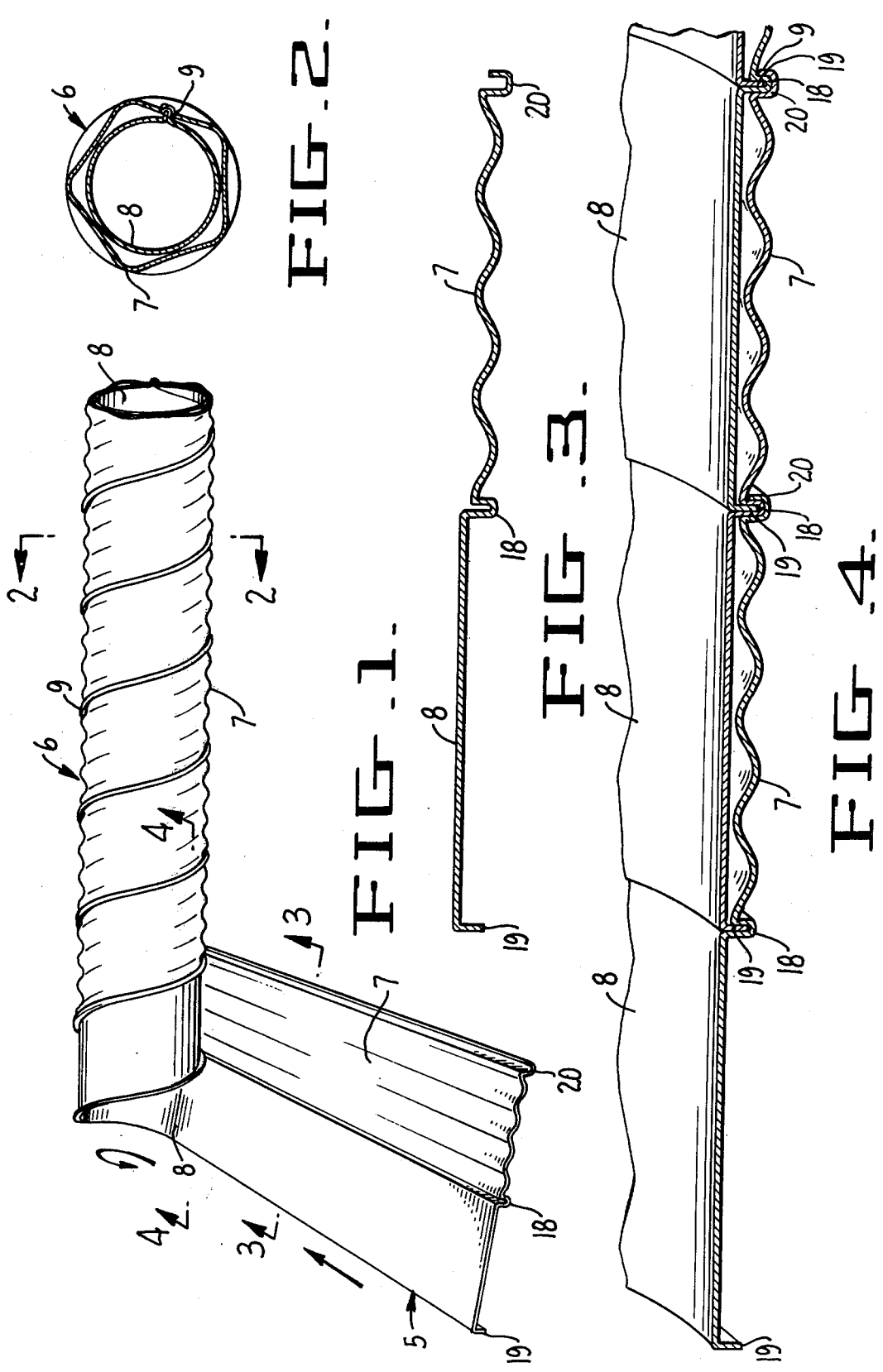

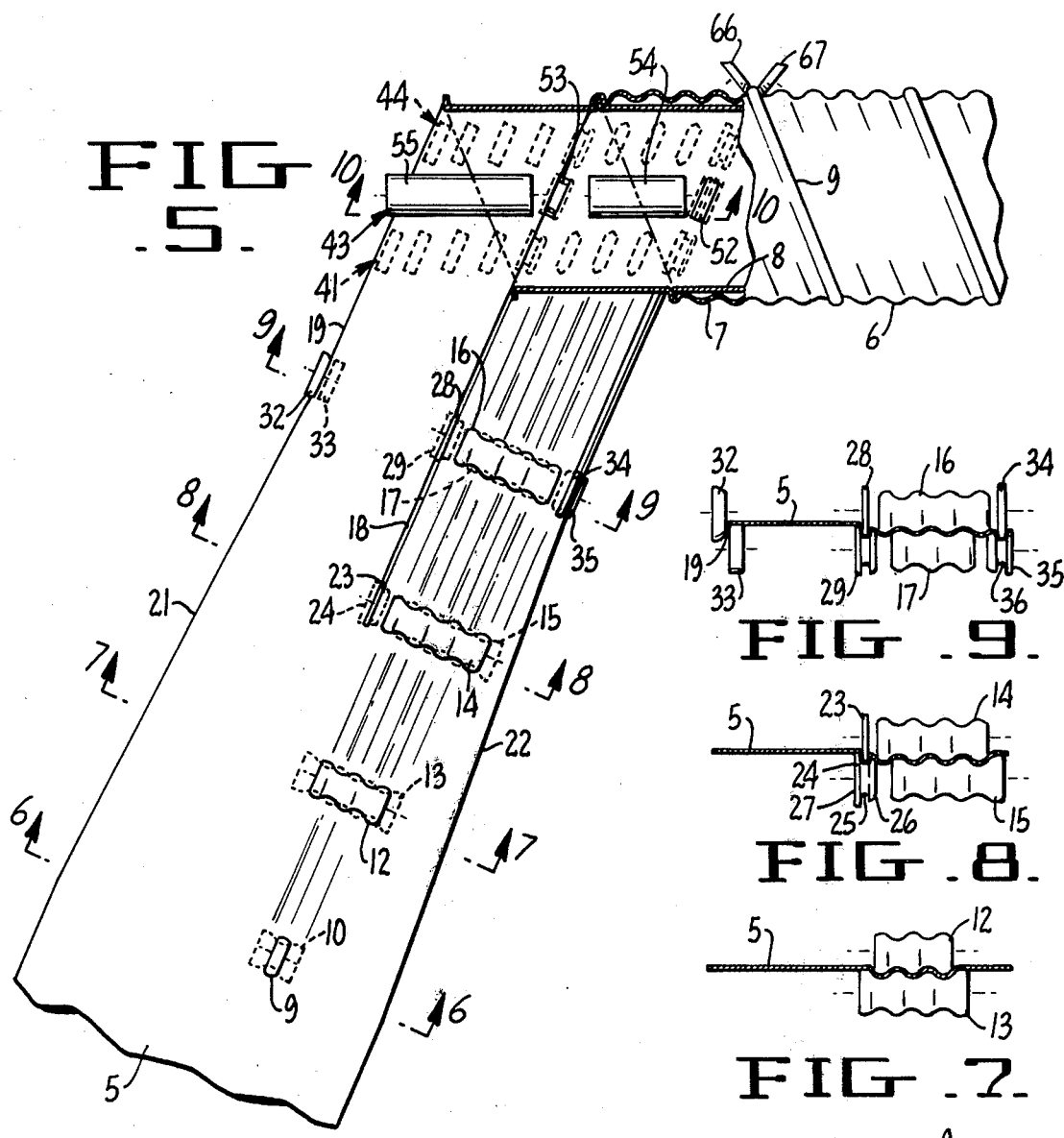

DOUBLE WALL HELICAL PIPE AND STRIP CONFIGURATION FOR FORMING SAME

CROSS-REFERENCE TO RELATED APPLICATION

This is a divisional application of my co-pending application, Ser. No. 401,167, filed Sept. 27, 1973, now U.S. Pat. No. 3,857,159 for "Pipe Forming Method."

BACKGROUND OF THE INVENTION

This invention relates to double wall metal pipe, and more particularly, to double wall helical pipe formed of a single elongated strip, to the method of its formation and the configuration of metal strip utilized in such formation.

Pipe as herein described may be formed to have two smooth walls, two corrugated walls or one smooth and one corrugated wall, and a highly desirable form of such double wall pipe will have a smooth inner wall and a corrugated outer wall. The pipe can be used in place of conventional corrugated pipe for underground drains, culverts, and the like, or for efficient transfer of liquids, air or other gases, and in such applications the smooth inner wall will avoid problems associated with a corrugated surface such as poor drainage from corrugation valleys and, during cold weather, formation of ice in the corrugations. A corrugated surface in a liquid conveying pipe causes interference with and turbulence in the flow of liquid. Pipe having a corrugated outer wall and smooth inner wall avoids the problems associated with a corrugated interior surface and at the same time exhibits increased strength relative to single wall pipe of corresponding wall thickness. Double wall construction lends itself to the use of special purpose insulating or corrosion resistant materials for the inner wall or layer between walls.

Known forms of double wall metal pipe are fabricated from two sheets, strips or tubes of metal rather than from a single strip. For example, in the method for forming laminated pipe disclosed in U.S. Pat. No. 3,487,537, Lombardi, two metal strips are advanced along two separate forming mills and are curled together to form helical pipe. Forming double wall pipe from a single strip avoids the need for precisely aligning and coordinating manipulation of two separate work pieces. This is a significant advantage as it is very difficult to effect accurate control of metal strip during pipe forming, especially in the case of strip material for forming heavy wall pipe having a thickness in excess of one-eighth inch. Simplified forming equipment may be utilized when forming from only one strip since, for example, the method obviates the need for two separate strip coil reels and mills such as disclosed in the method of U.S. Pat. No. 3,487,537.

SUMMARY OF THE INVENTION

In the double wall helical pipe forming method of this invention an elongated strip of metal is advanced along its longitudinal axis for feeding to a curling station, and at such station is curled into overlapped helical convolutions about a pipe axis extending at an oblique angle with respect to the longitudinal axis of the incoming strip. The convolutions are joined at helically extending seams, and the completed pipe is advanced along its axis as it is continuously formed.

As the strip is advanced to the curling station it is passed between sets of rolls which form pipe seam elements along each side edge of the strip and a continuous seam element midway between those at the opposite side edges. In the case of double wall pipe having one or both walls corrugated, roll sets are provided for forming the appropriate corrugations.

As the strip is curled at the curling station, the same element at the end of the strip that trails relative to the direction of advance of the completed pipe, is curved along a helical path and brought into engagement with the seam element that is central of the strip. Thereby, the portion of the strip lying between the seam element at the trailing side edge of the strip and the central seam element is superposed over the portion of the strip lying between the central seam element and the seam element at the opposite, leading, side edge of the strip to yield a double wall pipe structure. The continuous formation of such double wall structure is accomplished by engagement of the central seam element and the seam element at the trailing side edge, and then after the two combined seam elements complete one rotation, engagement of the combined elements with the seam element at the leading side edge. As a final step, the three seam elements are secured together.

Accordingly, principal objects of this invention are to provide a simplified method of forming double wall helical metal pipe, and a double wall pipe forming method in which proplems of handling a plurality of work pieces are avoided. Further objects are the provision of a high strength double wall helical pipe having a highly secure pipe seam, and a configuration of metal strip for forming from one such strip double wall pipe heretofore requiring more than one pipe forming work pieces.

There are other objects and advantages of the invention as will become apparent from the following description of the preferred embodiments of the invention.

DESCRIPTION OF THE FIGURES

FIG. 1 is a perspective view of a length of double wall pipe of this invention showing stages of its formation from uncurled metal strip to completed pipe;

FIG. 2 is a cross-sectional view of the pipe of FIG. 1, having a corrugated outer wall and smooth inner wall, taken along line 2—2 of FIG. 1;

FIG. 3 is a cross-sectional view of the metal strip of FIG. 1 prior to curling, taken along line 3—3 of FIG. 1;

FIG. 4 is a sectional view taken along line 4—4 of FIG. 1 and showing successive conditions of the metal strip during curling until completion of pipe formation;

FIG. 5 is a diagrammatic view of apparatus for practicing the method of this invention;

FIGS. 6, 7, 8, and 9, respectively taken along lines 6—6, 7—7, 8—8 and 9—9 of FIG. 5, are each fragmentary views showing apparatus employed in forming the metal strip of FIG. 5 and together showing the successive stages of formation of longitudinal corrugations and seam elements in such strip;

DESCRIPTION OF PREFERRED EMBODIMENTS

Figure 11:
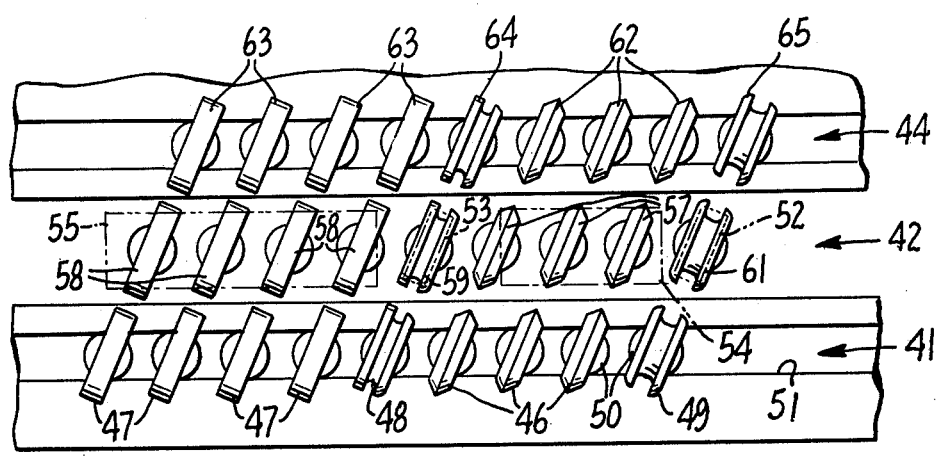
FIG. 11 is a fragmentary top plan view of a portion of the curling apparatus of FIGS. 5 and 10 as seen from line 11—11 of FIG. 10.
Figure 10:
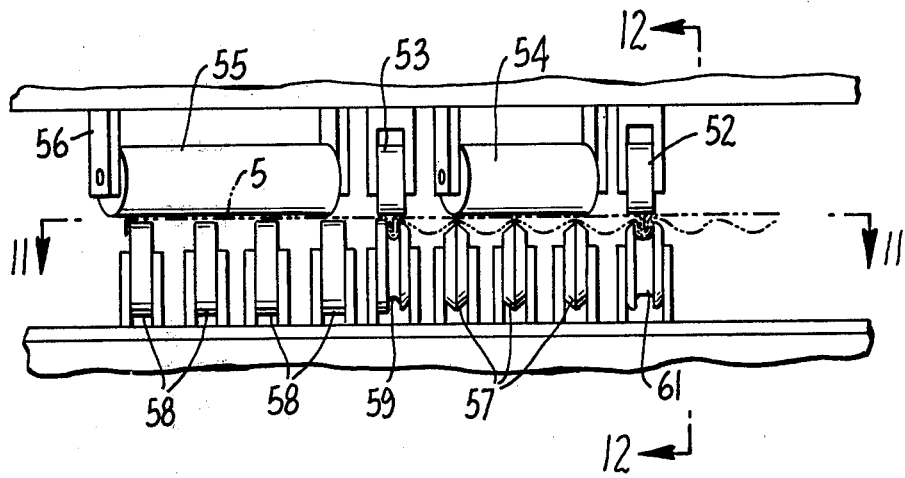
FIG. 10 is an elevational fragmentary view of curling apparatus for practice of the method of this invention as viewed from line 10—10 of FIG. 5.

Referring to FIGS. 1 and 5, the pipe forming method of this invention comprises generally the steps of advancing a metal strip 5 along a substantially planar path in the direction of its longitudinal axis to a curling apparatus generally designated 11 (FIG. 5), and with apparatus 11, curling strip 5 about an axis extending at an oblique angle to the longitudinal axis of the strip into a series of overlapped helical convolutions.

Strip 5 normally is provided in a coil, and after being peeled from a conventional coil handling means (not shown) is passed through sets of forming rolls interposed in the path of the strip as it advances to curling apparatus 11. When it is desired to make a preferred form of double wall pipe 6 (FIGS. 1 and 2) having a corrugated outer wall 7 and smooth inner wall 8, the advancing strip 5 passes through sets of corrugating rolls 9, 10 (FIGS. 5, 6), 12 13 (FIGS. 5 and 7), 14, 15 (FIGS. 5 and 8) and 16, 17 (FIGS. 5 and 9). Strip 5 includes opposite side edges 21, 22, and the sets of corrugating rolls progressively form a series of corrugations extending longitudinally of the strip from a point midway between side edges 21 and 22 to a point adjacent side edge 22, which as will be seen, will be the leading side edge during the curling operation.

As the strip is advanced to curling apparatus 11 it also is passed through pairs of rollers for forming seam elements, which in the illustrated preferred form, are lock seam elements. A central seam element 18 (FIGS. 1, 3–5, 8), is formed by roller 23, coaxial with corrugating roll 14, and roller 24, coaxial with rolls 15. The face of roller 24 is formed with a rounded groove 25, and the face of roller is received therein. The flange 26 at the side of groove 25 nearest roll 15 has the same diameter as the widest portions of roll 15, and the flange 27 at the opposite side of groove 25 has a flat face which extends to a slightly greater diameter than flange 26. A mated pair of rollers 28 and 29, respectively coaxial with rolls 16 and 17 are similar to rollers 23 and 24. As best seen in FIG. 3, the rollers 23, 24 and 28, 29 provide a U-shaped central seam element 18. The side of the "U" adjacent the corrugated portion 7 of the strip which is to become the pipe outer wall is shorter than the side adjacent the flat portion 8 which is to become the interior wall.

Coaxial with rolls 16, 17 respectively, are flat faced rollers 32 and 33 which are offset for bending a marginal portion of strip 5 at edge 21 to provide a seam element 19 (FIGS. 1, 3–5, 9) in the form of a right angle extending in the same direction relative to strip 5 as U-shaped seam element 18, and as will be seen, of a length to be fully received within seam element 18 during the curling operation. The seam element 20 (FIGS. 1, 3–5, 9) is formed at the opposite side edge 22 by a pair of rollers 34, 35, respectively coaxial with rolls 16, 17. The face of roller 35 is formed with a rounded groove 35 that is broader than the groove 25 in rollers 24 and 29, and the face of roller 34 is shaped to be received within the groove 36. As best seen in FIG. 3, rollers 34, 35 form a U-shaped seam element 20 in the marginal portion of strip 5 at edge 22 extending in the same direction relative to strip 5 as seam elements 18 and 19, and of suitable width and depth to permit receipt of seam element 18 therein during the curling operation. In the configuration of strip 5 illustrated in FIG. 3 seam elements 18, 19 and 20 and the corrugations in strip portion 7 are so dimensioned that when the seam elements are completely interfitted during curling (FIG. 4) and the helical convolutions are formed, strip portion 8 is slightly spaced from the nearest points of the corrugations in strip portion 7.

Figure 12:
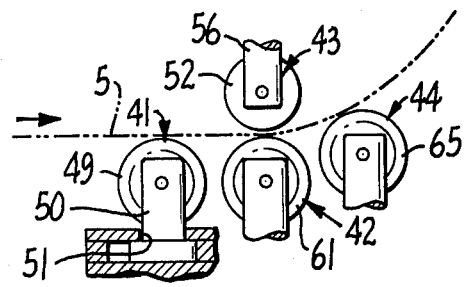
FIG. 12 is a fragmentary sectional view taken along line 12—12 of FIG. 10 showing the relationship among curling rolls of the curling apparatus of FIG. 10.

The advancing strip, after having been formed into the desired configuration with corrugations and the seam elements 18, 19 and 20, is presented at the curling apparatus 11 which in the illustrated form comprises four curling rolls, being a lead roll 41 (FIGS. 5, 11 and 12), anvil roll 42 (FIGS. 5, 10–12), mandril roll 43 and buttress roll 44 (FIGS. 5, 11 and 12). The axes of the four rolls are parallel to each other and to the axis of the pipe to be formed and extend at an oblique angle to the longitudinal axis of incoming strip 5 which will vary according to the width of strip 5 and desired pipe diameter. Thus, the group of rolls 41, 42, 43, 44 and the incoming strip 5 are adapted for relative pivoting.

Last roll 41 (FIGS. 5 and 11) includes a series of individual rollers 46 having faces configured to mate with the valleys of the corrugations in strip portion 7, a series of flat faced rollers 47 for contacting strip portion 8, a grooved central roller 48 similar to seam forming rollers 24 and 29, and a grooved edge roller 49 similar to roller 35. The planes of the individual rollers 46, 47, 48 and 49 are to be parallel to the longitudinal axis of strip 5, and the rollers each are rotatably mounted in a yoke 50 which is pivotable in a way 51 to permit correct positioning of individual rollers when the angle between the axis of roll 41 and longitudinal axis of the strip 5 is changed. Yoke 50 may be locked in position in way 51 by any suitable means. As seen in FIG. 12 the rollers of roll 41 contact the lower surface of incoming strip 5.

Mandril roll 43 (FIG. 10) includes a flat faced seam roller 52 which engages the inside surface of strip 5 as it is being curled and bears against the seam elements thereof at the point directly below the pipe axis where seam elements 18 and 19 are curled into engagement with seam element 20 (FIG. 5). A central roller 53 of roll 43 is similar to roll 52 but positioned to bear against the seam elements at the point where the seam element 19 is curled into seam element 18 (FIG. 5). Rollers 52 are each mounted in yokes 56 (FIGS. 10, 12) so that the faces thereof may be positioned for rolling movement in the direction of the helix line of the pipe to be formed. Elongated cylindrical roller 54, 55 having a common axis of rotation parallel to the axis of the pipe to be formed are respectively disposed at opposite sides of roller 53, so that roller 54 contacts the inner surface of strip portion 8 along a line where curling is initiated, and roller 55 contacts such surface where portion 8 completes one convolution.

Anvil roll 42 (FIG. 10) contacts the outer surface of strip 5 directly below roll 43 at the point where seam elements 18, 19 and 20 curl into engagement, and roll 42 includes rollers 57, rollers 58, roller 59 and roller 61 respectively similar to rollers 46, rollers 47, roller 48 and roller 49 of lead roll 41. Roller 61 differs slightly from roller 49 in that the face thereof is shaped to conform to the corrugation contour of the pipe on both sides of the groove therein. The rollers of roll 42 are mounted for pivoting in the same manner as the rollers of roll 43. Buttress roll 44, has rollers 62 (FIG. 19, rollers 63, roller 64 and roller 65 respectively similar to rollers 57, rollers 58, roller 59 and roller 61 of roll 42. Roll 44 is at the opposite side of anvil roll 42 from lead roll 41 and contacts the outer surface of strip 5 at points offset from the path of the incoming strip (FIG. 12) for causing curling of the strip. The rollers of buttress roll 44 are pivotally mounted in the same manner as the rollers of lead roll 41.

As illustrated in FIGS. 5 and 12, during the curling step of the pipe forming method the incoming strip first contacts the rollers of lead roll 41, is then passed between anvil roll 42 and mandril roll 43 into contact with offset buttress roll 44 for causing curling of the strip. When strip 5 and set of curling rolls 41, 42, 43 and 44 are positioned to have the proper angular relationship for the particular strip width and diameter of pipe to be formed, strip 5 will thereby be curled so that seam element 19 at the trailing side edge 21 will be received within seam element 18 when such elements pass between rollers 53 and 59 respectively of rolls 43 and 42, and seam element 18 with seam element 19 therein will be received within seam element 20 at the leading side edge 22 where the seam elements pass between rollers 52 and 61 respectively of rolls 43 and 42. There are provided a pair of pinch rollers 66 and 67 (FIG. 5) positioned for pressing the combined seam elements 18, 19, 20 together for forming therefrom a highly secure helical lock seam 9 (FIGS. 1 and 5). The resulting double wall pipe comprises a corrugated outer wall formed of the strip portion 7 and a smooth interior wall formed of strip portion 8.

The method of the invention is therefore seen to comprise a step of advancing a metal strip 5 along is longitudinal axis to a curling station having curling apparatus 11. Before curling strip 5 a first pipe seam element 19 is formed therein along the marginal portion of trailing side edge 16 projecting in a direction with respect to the strip. There is also formed a second pipe seam element 20 along the marginal portion of the opposite leading side edge 22 projecting in the same direction with respect to the strip. A third central pipe seam element 18 is formed in the advancing strip also projecting in the same direction. Thereafter strip 5 is curled about in axis extending at an oblique angle with respect to its longitudinal axis into helical convolutions in which the strip portion lying between seam elements 18 and 20 is superposed over the strip portion extending between seam elements 18 and 19, and seam elements 18, 19 and 20 are interconnected to provide a continuous helical pipe seam 9 of a double wall pipe 6. In a preferred method only the strip portion lying between seam elements 18 and 20 is formed with longitudinal corrugation prior to curling so that the resulting pipe 6 has a corrugated outer wall and smooth inner wall.

Figure 13:
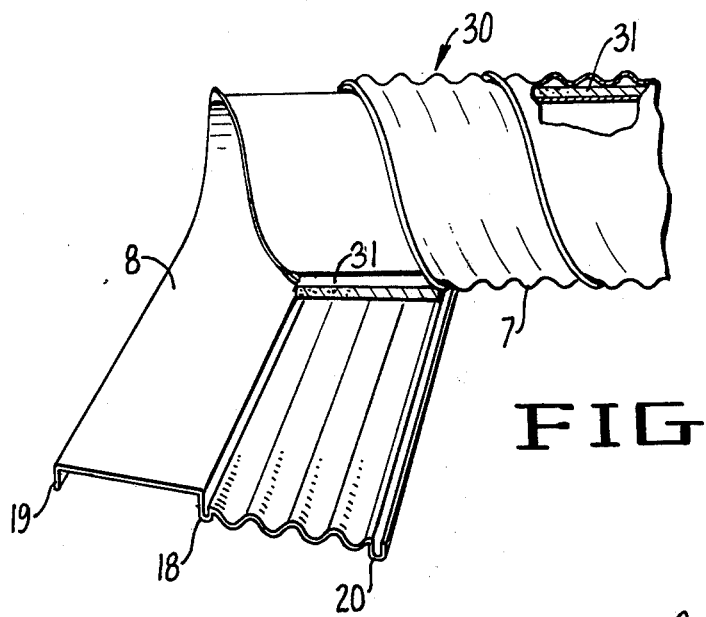
FIG. 13 is a perspective view showing stages of formation of a modified form of double wall pipe of this invention having an insulating layer.
Figure 14:
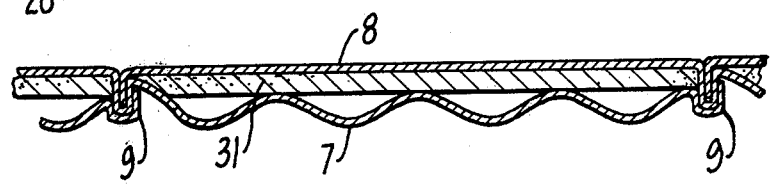
FIG. 14 is a sectional view of the form of pipe of FIG. 13 taken along a line parallel to the pipe axis.

A modified form of double wall pipe 30 (FIGS. 13 and 14) having an insulating wall 31 is formed by the above-described method, but including the additional step of introducing a batt of insulating material between seam elements 18 and 19 against the strip portion providing inner wall 8 during curling of the strip. The insulating material may be any suitable material for the purpose, for example, as sold under the FIBERGLAS and STYROFOAM trademarks or an asbestos composition. During the curling operation insulating wall 31 is formed to lie between outer wall 7 and inner wall 8. The form of pipe 30 is utilized to advantage in any application where it is desired to decrease the transfer of heat through the pipe walls.

Figure 15:
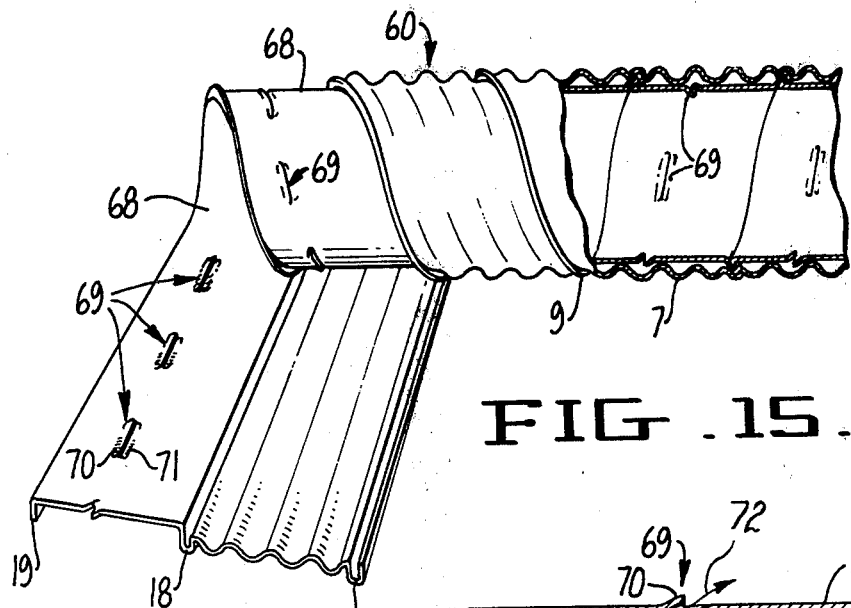
FIG. 15 is a perspective view showing stages of formation of a further modified form of double wall pipe of this invention having a louvered inner wall.
Figure 16:
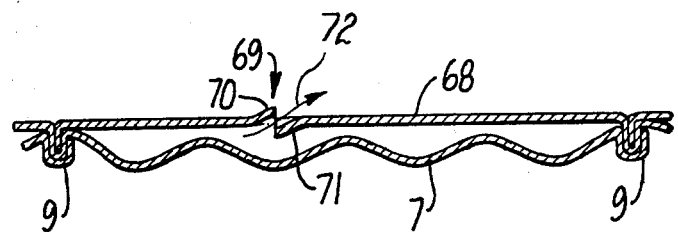
FIG. 16 is a sectional view of the form of pipe of FIG. 15 taken along a line parallel to the pipe axis.

A further modification in the pipe and pipe forming method is illustrated in FIGS. 15 and 16, showing a form of pipe 60 having an inner wall 68 in which there is a series of perforations or openings which may take the form of louvers 69 extending along a helix line of pipe 60. Prior to curling the strip, louvers 69 are formed in a regularly spaced series extending longitudinally in the strip portion providing pipe wall 68. Each louver includes opposed elongated vane portions 70, 71, projecting toward the interior of the pipe and toward outer wall 7, respectively (FIG. 16) after completion of the curling operation. When pipe 60 is utilized air under pressure can be introduced between walls 7 and 68 and passed through louvers 69 to the pipe interior, with the air stream deflected in the direction of arrow 72 by vane portion 70. Pipe 60 may be used to carry particulate materials such as wood chips, and the introduction of air as described desirably affects the flow of such material through the pipe in the same direction as the general direction of the deflection air stream.

It is to be understood that the claims appended hereto are intended to cover all changes and modifications of the examples herein chosen for purposes of disclosure which do not depart from the spirit and scope of the invention. For example, portions of the metal strip may be formed with corrugations other than as shown, perforated or maintained in a flattened condition so that the interior and the exterior walls may either or both be smooth, corrugated or provided with other configurations, such as a series of openings or perforations along a helix line. Additionally, the helical pipe seam may be formed by welding other mechanical joints.

I claim:

1. A configuration of strip for forming double wall helical seam pipe by curling a single workpiece, comprising in uniform cross-section:
    a. a right angle flange formed along one side edge portion of said strip and projecting to a side of the plane of said strip and defining a first pipe seam element;
    b. a U-shaped portion formed along the side edge portion opposite said one side edge portion and projecting to the same side of the plane of said strip as said flange for defining a second pipe seam element;
    c. a U-shaped portion formed longitudinally of said strip midway between and to the same side of the plane of said strip as said first and second seam elements and defining a third seam element;
    d. said third seam element being proportional for receipt of said first seam element and said second seam element being proportioned for receipt of said third seam element; and
    e. strip portions respectively extending between said first seam element and said third seam element and between said second seam element and said third seam element.

2. The configuration of strip of claim 1, including:
    f. a series of currugations in the strip portion extending between at least one adjacent pair of said seam elements.

3. The configurations of strip of claim 2, wherein:

g. said series of corrugations are in said strip portion between said second seam element and said third seam element and said strip portion between said first seam element and said second seam element is flat.

4. Double wall helical seam pipe formed from a single elongated strip having parallel side edges, comprising:
   a. first and second pipe seam elements respectively at the opposite side edge portions of said strip;
   b. a third pipe seam element longitudinally in said strip midway between said first and second seam elements;
   c. an inner wall formed of helical convolutions of the portion of said strip between said first and third seam elements;
   d. an outer wall formed of helical convolutions of the portion of said strip between said second and third seam elements; and
   e. a helical pipe seam formed of said first, second and third seam elements in interconnected relationship with said third seam element between said first and second seam elements.

5. The double wall pipe of claim 4, wherein:
   f. at least one of said walls is helically corrugated.

6. The double wall pipe of claim 4, wherein:
   f. said seam elements are lock seam elements interlocked to provide a lock seam.

7. The double wall pipe of claim 4, including:
   f. a layer of thermal insulating material between said inner and outer walls.

8. The double wall pipe of claim 4, including:
   f. a plurality of openings formed in said inner wall.

9. The double wall pipe of claim 5, wherein:
   g. the corrugations in said helically corrugated wall are spaced from contact with the other one of said walls of said pipe.

* * * * *

UNITED STATES PATENT OFFICE
CERTIFICATE OF CORRECTION

Patent No. 4,129,152          Dated December 12, 1978

Inventor(s) Paul K. Davis

It is certified that error appears in the above-identified patent and that said Letters Patent are hereby corrected as shown below:

Column 2, line 34, "piece_s_" should be "piece";

Column 2, line 51, "diagrammatic view" should be "diagrammatic _plan_ view";

Column 4, line 1, "3_5_" should be "3_6_";

Column 4, line 29, "_Last_" should be "_Lead_";

Column 5, line 5, "(Fig. 1_9_," should be "(Fig. 1_1)_,";

Column 5, line 38, "is" should be "i_t_s";

Column 6, line 25, "deflect_ion_" should be "deflect_ed_";

Column 6, line 55, "proportion_al_" should be "proportion_ed_";

Column 6, line 66, "c_u_rrugations" should be "c_o_rrugations".

Signed and Sealed this

Twenty-seventh Day of March 1979

[SEAL]

Attest:

RUTH C. MASON
*Attesting Officer*

DONALD W. BANNER
*Commissioner of Patents and Trademarks*